(No Model.) 7 Sheets—Sheet 1.

A. METTLER.
SCREW CUTTING MACHINE.

No. 537,898. Patented Apr. 23, 1895.

WITNESSES:
William Goebel
Theo. G. Hoster

INVENTOR
A. Mettler
BY
Munn & Co.
ATTORNEYS.

(No Model.) 7 Sheets—Sheet 2.
A. METTLER.
SCREW CUTTING MACHINE.

No. 537,898. Patented Apr. 23, 1895.

WITNESSES:
William Goebel.
Theo. G. Hoster

INVENTOR
A. Mettler
BY
Munn & Co
ATTORNEYS.

(No Model.) 7 Sheets—Sheet 5.

A. METTLER.
SCREW CUTTING MACHINE.

No. 537,898. Patented Apr. 23, 1895.

WITNESSES:
William Goebel
Theo. J. Hostetter

INVENTOR
A. Mettler
BY Munn & Co
ATTORNEYS.

(No Model.) 7 Sheets—Sheet 6.

A. METTLER.
SCREW CUTTING MACHINE.

No. 537,898. Patented Apr. 23, 1895.

WITNESSES:
William Goebel
Theo. G. Hoster

INVENTOR
A. Mettler
BY
Munn & Co
ATTORNEYS.

UNITED STATES PATENT OFFICE.

ADOLF METTLER, OF HARTFORD, CONNECTICUT, ASSIGNOR, BY MESNE ASSIGNMENTS, TO THE SPENCER AUTOMATIC MACHINE SCREW COMPANY, OF SAME PLACE.

SCREW-CUTTING MACHINE.

SPECIFICATION forming part of Letters Patent No. 537,898, dated April 23, 1895.

Application filed August 13, 1894. Serial No. 520,204. (No model.)

*To all whom it may concern:*

Be it known that I, ADOLF METTLER, of Hartford, in the county of Hartford and State of Connecticut, have invented a new and Improved Screw-Cutting Machine, of which the following is a full, clear, and exact description.

The invention relates to screw cutting machines, such as shown and described in Letters Patent of the United States No. 513,334, granted to Caspar W. Mettler on the date of January 23, 1894.

The object of the invention is to provide a new and improved screw cutting machine designed for forming slotted head and other screws in a very rapid and economical manner.

The invention consists in certain parts and details, and combinations of the same, as will be hereinafter fully described and pointed out in the claims.

Reference is to be had to the accompanying drawings, forming a part of this specification, in which similar letters and figures of reference indicate corresponding parts in all the views.

The improved screw cutting machine is provided with a suitably constructed frame A, in which is journaled the longitudinally-extending cam shaft B, carrying at one end a worm wheel B′ in mesh with a worm B² formed on the transverse-extending driving shaft B³, journaled in suitable bearings in the upper end of the main frame A. A clutch B⁴ is adapted to connect the driving shaft B³ with a cone pulley B⁵ connected by a belt with suitable machinery for imparting a rotary motion to the said driving shaft B³, the worm B², worm wheel B′ and cam shaft B, as long as screws are cut from the stock in the machine.

On the cam shaft B, near the upper end of the main frame A, is secured a cam C, adapted to impart the necessary motion to the feeding device, for moving the stock at intervals for the formation of the screw, as hereinafter more fully described. The cam C is adapted to actuate a lever C′, fulcrumed on the main frame A, and operating with its free end between the lugs C² and C³ formed on a slide C⁴, mounted in suitable bearings and provided with a set screw C⁵ adapted to abut on a second slide C⁶, likewise carrying a set screw C⁷ adapted to abut on a slide C⁸, in which is journaled the sleeve D, containing a second sleeve D′ through which passes the wire rod E, forming the stock from which the screws are cut.

Figures 13, 14:
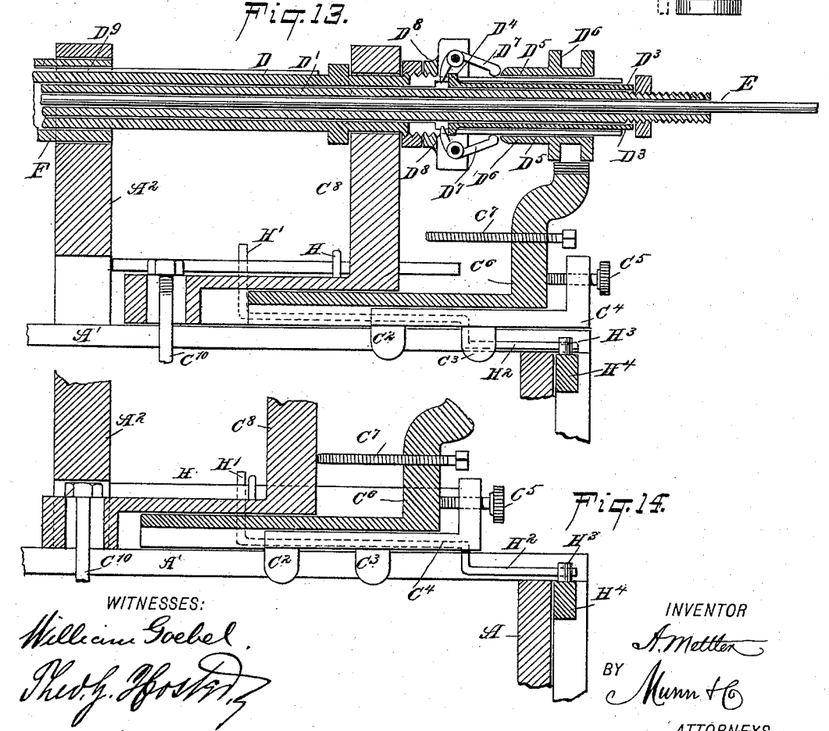
Fig. 13 is an enlarged sectional side elevation of the stock feeding device.
Fig. 14 is a similar view of the same, with parts in a different position.

The inner end of the sleeve $D'$ is split, and made with a conical head $D^2$, see Fig. 22, adapted to engage the slightly beveled inner end of the sleeve D to close the said split head of the sleeve $D'$ whenever the latter is pushed rearward, so as to firmly grip the stock E and securely hold the same in position while undergoing turning, tapping and other operations hereinafter more fully described. Near the outer end of the sleeves D, $D'$ is held a collar $D^3$ fitting into an enlarged recess in the sleeve D and having offsets $D^4$ fitting into longitudinally extending slots $D^5$ formed in the said rear end of the sleeve D. See Figs. 13, 22 and 23. A clutch collar $D^6$ having a conical or beveled end is held on the slotted end of the sleeve D and is engaged by the forked end of the slide $C^6$ so as to move longitudinally with the latter and still be free to turn with the sleeve.

The clutch collar $D^6$ is adapted to operate a set of levers $D^7$ held on a collar $D^8$ and adapted to engage the offsets $D^4$ so that when the said clutch collar $D^6$ is moved inward by a like movement of the slide $C^6$, the said levers are actuated and the collar $D^8$ is moved outward to cause a sliding of the sleeve $D'$ rearward to move the split head $D^2$ in engagement with the sleeve D so as to fasten the stock E in position in the said sleeve $D'$. At the time this takes place the set screw $C^7$ has moved against the slide $C^8$, so that on the further action of the cam on the lever $C'$, the latter moves the slides $C^4$, $C^6$ and $C^8$ inwardly, to shift the sleeves D and $D'$ together with the gripped stock E, so as to feed the latter forward for the formation of a screw. The slide $C^4$ is fitted to slide longitudinally in suitable bearings on the slide $C^6$, and the latter is fitted to slide in suitable bearings on the slide $C^8$, and this latter slide is fitted to slide in suitable bearings in the top plate $A'$ of the main frame A.

The levers $D^7$ are fulcrumed in the collar $D^8$ secured on the sleeve D, as plainly shown in the drawings. The lever $C'$ is adapted to be acted on by the cam C in the following manner: First, the inclined part 1, of cam C engages the end of the lever $C'$, to move the latter a sufficient distance to cause the split end $D^2$ of sleeve $D'$ to close upon the stock E as previously described, to grip the same, and then the part 2 of the cam C acts on the lever $C'$, to push the several slides connected with the lever forward, to feed the stock E a sufficient distance for forming the screw, and then the lever $C'$ passes into a notch 3, to temporarily shift the stock E rearwardly, to disengage the cutters for forming the shank. Next, the cam C at the cam surface 4, shifts the lever $C'$ for feeding the stock E again inward, for forming the head of the screw, and then the cam drops off at 5, on the end of the lever $C'$, to permit a return movement of the several slides forming the feed for the stock. This return movement is accomplished by a cam $C^9$ secured on the cam shaft B, next to the cam C, and adapted to act on a rod $C^{10}$ secured to the slide $C^8$, as plainly shown in the drawings.

The cam $C^9$ (see Fig. 6) is provided with the inclined cam surface 6, adapted to act on the rod $C^{10}$, to push the slide $C^8$ outward after a screw has been cut off from the stock. Then the rod $C^{10}$ drops into a notch 7, to be then engaged by a nose 8, so as to move the stock in an inverse direction a short distance, for releasing the stock from the sleeve $D'$, to again permit a forward feeding of the stock as previously described, by the action of the cam C on the lever $C'$. A rotary motion has to be given to the stock E in opposite directions, during the formation of each screw, and for this purpose the sleeve or hollow spindle F fitted over the sleeve D and journaled in suitable bearings $A^2$ is provided with a longitudinal slot or key-way to receive a key $D^9$ on the sleeve D. On this sleeve F are secured the two pulleys $F^4$ and $F^5$, between which is held a loose pulley $F^6$, as plainly shown in Fig. 5. A belt G normally engages the pulley $F^4$, while a second belt $G'$ engages the loose pulley $F^6$, the said two belts G and $G'$ being, however, adapted to be shifted simultaneously by shifting arms $G^2$ and $G^3$ respectively, held on a shifting arm $G^4$ forming part of a shifting lever $G^5$ fulcrumed on the main frame A, and carrying a friction roller $G^6$, adapted to be actuated from a cam $G^7$ secured on the cam shaft B. Now when the said cam $G^7$ actuates the lever $G^5$, the belts $G'$ and G are simultaneously shifted from the pulleys $F^4$ and $F^6$ respectively, to the pulleys $F^6$ and $F^5$ respectively, whereby the belt $G'$ now becomes the driving belt. The belt $G'$ is driven in the reverse direction to belt G or it may be a crossed belt which rotates the spindle F in an inverse direction to that previously given to it by the belt G at the time the latter was in engagement with the pulley $F^4$. This shifting of the belts is necessary to rotate the stock in an inverse direction to unscrew the tapped screw from the tap as hereinafter more fully described, and then after the cam $G^7$ has been disengaged from the lever $G^5$ the belt shifting lever $G^5$ is again returned to its original position by the retracting spring $G^{5\times}$ so as to move the belts G and $G'$ back to their normal positions shown in Figs. 1 and 5, to cause the spindle F to again rotate from the left to the right.

In order to limit the return movement of the slides and also to determine the length of the head of the screw to be formed, I provide the slide $c^8$ with a transversely-extending arm H (see Figs. 12, 13 and 14) adapted to engage the curved end $H'$ of a lever $H^2$ fulcrumed on the top $A'$ and adapted to engage a pin $H^3$ projecting upwardly from a slide $H^4$ mounted to slide transversely in suitable bearings in the upper end of the main frame A. On this slide $H^4$ is arranged a boss $H^5$, adapted to move opposite a screw $H^6$ screwing in the slide $C^8$, the said boss being also adapted to engage a set screw H⁷ screwing in an arm H⁸ pivoted on the front end of the slide C⁸, said arm H⁸ being pressed on by a spring H⁹. The return movement of the slide H⁴ is accomplished by a spring H¹⁰, connecting the said slide with a staple on the frame A. Now when the slide C⁸ moves inward, then the arm H finally engages the curved inclined end H' of the lever H², so that the latter shifts the slide H⁴ to the front against the tension of the spring H¹⁰, to cause the screw H⁷ to strike or butt on the boss H⁵ as soon as the slide C⁸ comes back from threading, and to hold the slide C⁸ and stock or wire E in position until the screw is cut off. Then the slide C⁸ will move inward a short distance and the slide H⁴ will be pulled back by the spring H¹⁰, and then the slide C⁸ comes back for the stock and the boss H⁵ will rest on the screw H⁶.

Figure 9:
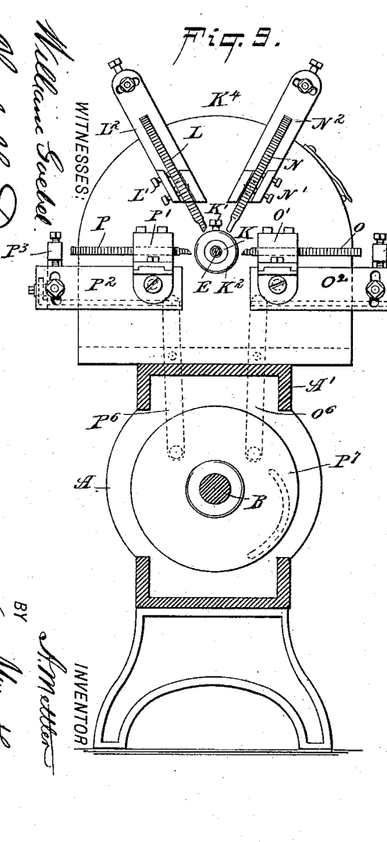
Fig. 9 is a transverse section of the improvement on the line 9—9 of Fig. 1.
Figure 10:
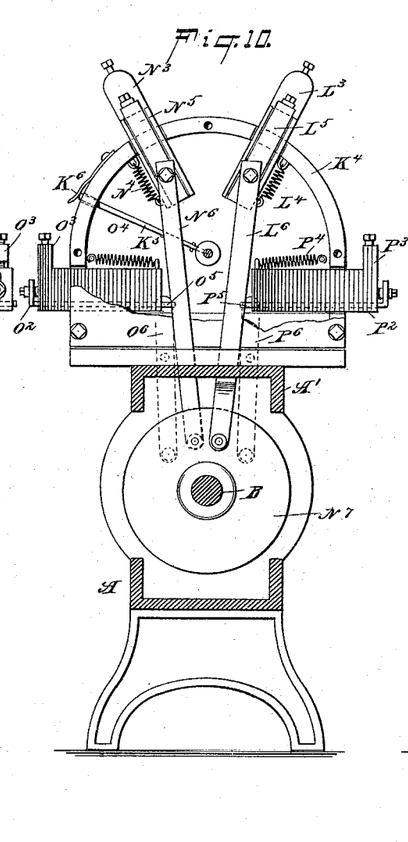
Fig. 10 is a similar view of the same, on the line 10—10 of Fig. 1.
Figure 11:
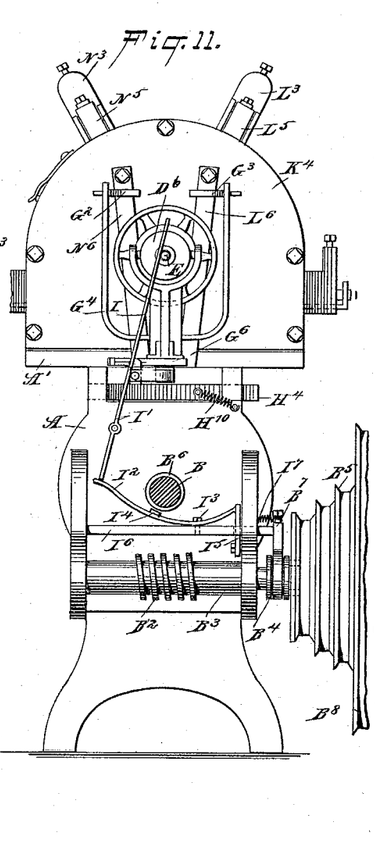
Fig. 11 is an upper end view of the improvement, with the cam shaft in section.
Figure 12:
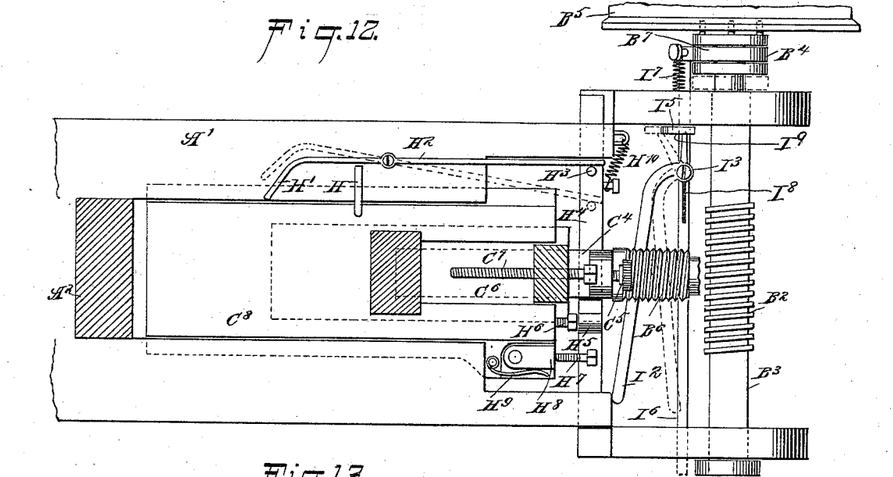
Fig. 12 is an enlarged sectional plan view of part of the stock-feeding device and adjacent parts, the section being taken on the line 12—12 of Fig. 5.

In order to automatically stop the machine when the end of the wire or stock E has passed into the clamping sleeve D', I provide a lever I, fulcrumed at I' to the upper end of the frame A, (see Fig. 11) and extending in an inclined direction, with the upper end of the lever resting loosely against one side of the stock E. The lower end of lever I is adapted to rest on the free end of a spring I², having a depending bent end I⁵ pivoted to the frame A as seen in Figs. 11 and 12, said bent end I⁵ of the spring engaging a notch I⁹ formed in one side of a slide-rod I⁶ longitudinally movable transversely of the frame A, and connected at its extremity to a clutch-lever B⁷, engaging the movable member B⁴ of the clutch which drives the shaft B³ from its cone-pulley B⁵. The lever B⁴ is provided with a retracting spring I⁷ arranged to hold said member B⁴ normally away from the pulley B⁵, but when the stock E has been arranged in position the rod I⁶ will be pushed over until the end I⁵ of spring I² engages with the notch I⁹ in the slide rod I⁶ when the parts will be held for the time being in that position. The spring I² carries a tooth or block I⁴ adapted to engage between the threads of a screw or worm B⁶ mounted on shaft B, but when the end of the spring I² is in engagement with the lower end of rod or lever I, said tooth I⁴ is held out of engagement with the worm B⁶. When the lever I is allowed to fall, by the passage of the end of the stock E, said spring I² is released and rises by its resiliency so as to engage its tooth with the threads of the worm B⁶. The spring I² has a pin I³ which works in a slot I⁸ formed in the slide rod I⁶ and said spring when its tooth is engaged by the rotating worm B⁶ turns on said pin I³ as a pivot whereby its opposite end I⁵ is moved slightly laterally out of engagement with the notch in slide rod I⁶ whereby the spring I⁷ is permitted to actuate the lever B⁷ to disengage the movable member B⁴ of the clutch from the member on pulley B⁵, and the machine is consequently stopped. The stock E, after leaving the end of the clamping sleeve D', passes to a bushing K, fastened in place by a set screw K' in a bushing K² secured in the front K³ of the tool casing K⁴ supported on the top A' of the main frame A, as plainly shown in Figs. 1, 2 and 5. (See also Figs. 9, 10 and 11.) The bushing K is held removably in the bushing K², to permit the operator to use different sized bushings for different sized stock to be formed into screws. On the front end of the bushing K, operate the cutting tools L and O, for reducing the stock to form the shank of the screw, and also the cutting tools N and P, for cutting off the screw after the head is formed, and after the shank is tapped as hereinafter more fully described. The cutters L and N stand at angles to each other and hold the stock securely in position as will be understood, and the said cutters are held by set screws L' and N' respectively in the two holders L² and N² respectively, held adjustably on slides L³ and N³ respectively, fitted to slide in suitable guideways formed in the tool casing K⁴. (See Fig. 10.) The slides L³ and N³ are held normally in an outermost position so as to hold the cutters L and N out of cutting contact with the stock, by means of springs L⁴ and N⁴ respectively, attached to the tool casing K⁴. The slides L³ and N³ are pressed inwardly against the tension of their springs L⁴ and N⁴ respectively, by arms L⁵ and N⁵ respectively, fitted to slide on the slides L³ and N³, and provided with set screws for regulating the contact of the said arms L⁵, N⁵, with their slides L³, N³. Cam arms L⁶, N⁶, respectively are pivotally connected with the said arms L⁵, N⁵, respectively, and are adapted to be actuated by cams L⁷, N⁷ respectively, secured on the cam shaft B. The other cutters O and P extend approximately on opposite sides of the stock E, as plainly shown in Fig. 9, and the said cutters are held adjustably in tool holders O' and P' respectively, attached to arms O² and P² respectively held adjustable on slides O³ and P³ respectively (see Fig. 10) held normally in their outermost position by springs O⁴ and P⁴, respectively, attached to the inside of the casing K⁴, as shown in the said Fig. 10. The arms O² and P² are provided with transversely extending guide arms O⁵ and P⁵ respectively, connected with the levers O⁶ and P⁶ respectively fulcrumed on the tool casing K⁴, and adapted to be actuated by cams O⁷ and P⁷ respectively, secured on the cam shaft B. Now it will be seen that the cams L⁷ and O⁷ operate in unison to simultaneously move the cutters L and O in engagement with the stock, to reduce the latter so as to form the blank shank E' (see Fig. 17) on the end of the stock projecting beyond the bushing K, as the said stock is fed inwardly by the action of the cam C as previously described. The other cutters N and P likewise operate in unison, and are actuated simultaneously from their cams N⁷ and P⁷, so that the stock is cut after the shank is threaded as hereinafter more fully described, to form the head E³, by making a cut E⁴ in the stock at the end of the bushing K. See Fig. 16.

Figure 16:
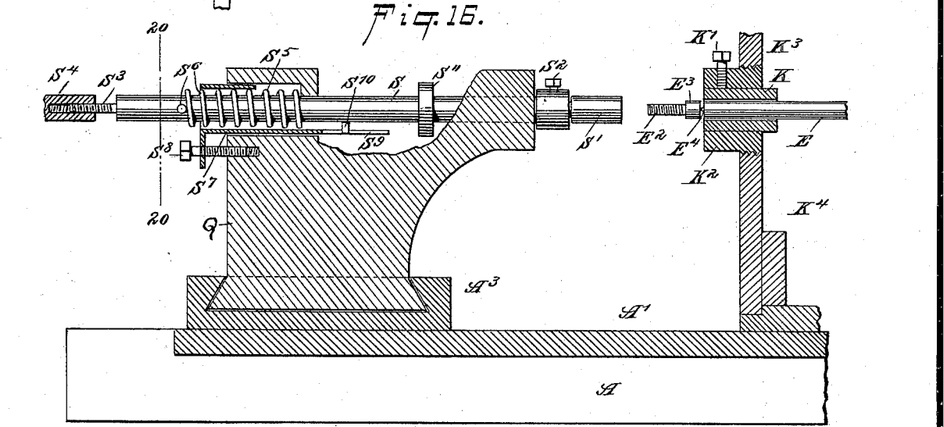
Fig. 16 is a similar view of the same, with parts in a different position.
Figure 17:
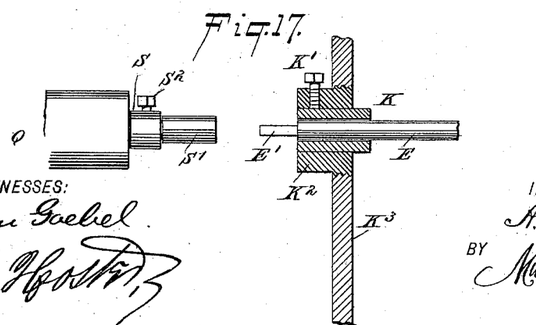
Fig. 17 is a sectional side elevation of part of the same previous to the tapping of the screw shank.

The cutters L, N, O and P are held adjustably in the devices described, so as to permit the operator to conveniently and properly set the cutting edges of the tools relative to the motion imparted to the tools by the actions of the cams, to reduce the stock to form the proper sized shank, and also to cut the stock to form the head without entirely cutting off the screw, as shown in Fig. 16, for the purpose hereinafter more fully described.

On the tail end of the main frame A, and on the top A' is formed a transversely-extending guideway $A^3$, in which is fitted to slide a carriage Q, supporting a longitudinally extending drill shaft R, adapted to carry a drill $x$ for boring a central hole in the screw to be formed, as hereinafter more fully described, the said carriage also supporting a die shaft S, adapted to support a die S', for cutting the thread on the reduced end of the stock, and on the said carriage is further mounted a holder T, adapted to take hold of the threaded shank, to break off the screw from the shank and to move it to the head-slotting device hereinafter more fully described. Normally, the carriage Q stands in the position shown in Fig. 2, that is, with the drill shaft R in alignment with the stock, and in order to successively move the die shaft S and the holder T in alignment with the stock, I provide a mechanism for imparting this motion to the carriage. On the under side of the carriage is pivoted a lever Q', fulcrumed on the main frame A, and adapted to be actuated from a cam $Q^2$ secured on the cam shaft B, and provided with two cam surfaces $Q^3$ and $Q^4$, of which the former, in acting on the lever Q', moves the carriage to the front in the direction of the arrow $a'$ (see Fig. 2), until the die shaft S is in alignment with the stock. The other cam surface $Q^4$ next engages the lever Q' so as to impart a further movement to the carriage Q in the direction of the arrow $a'$ and until the holder T is in alignment with the stock E. In order to impart a return movement of the carriage Q in the inverse direction of the arrow $a'$, I connect the rear end of the said carriage with a chain $Q^5$ passing over a pulley $Q^6$ journaled on the main frame A, the said chain $Q^5$ then hanging downward and carrying at its lower end a weight $Q^7$, sufficiently heavy to return the carriage Q after the cam surface $Q^4$ leaves the end of the lever Q'. A stop $Q^8$ held on the front end of the carriage serves to limit the rearward movement of the carriage Q, by the stop abutting against the front edge of the guideway $A^3$.

The drill shaft R, the die shaft S, and the holder T, are adapted to be acted on when in alignment with the stock by a lever U, fulcrumed at U' on a sleeve $U^2$ collared on the cam shaft B. This lever U is provided with a projection $U^3$ (see Fig. 5) adapted to be acted on by a cam $U^4$, secured on the cam shaft B, and provided with cam surfaces $U^5$ and $U^6$, adapted to engage the said projection $U^3$ so as to impart a swinging motion to the lever U, in the direction of the arrow $b'$, to actuate the shafts previously mentioned in the manner hereinafter more fully described. The drill shaft R is provided at its front end with a socket R', adapted to carry the drill for boring an aperture through the screw to be formed, whenever such form of screw is desired. If ordinary screws are desired to be made, then no drill is inserted in the socket R', and consequently no aperture is bored in the screw.

Figure 2:
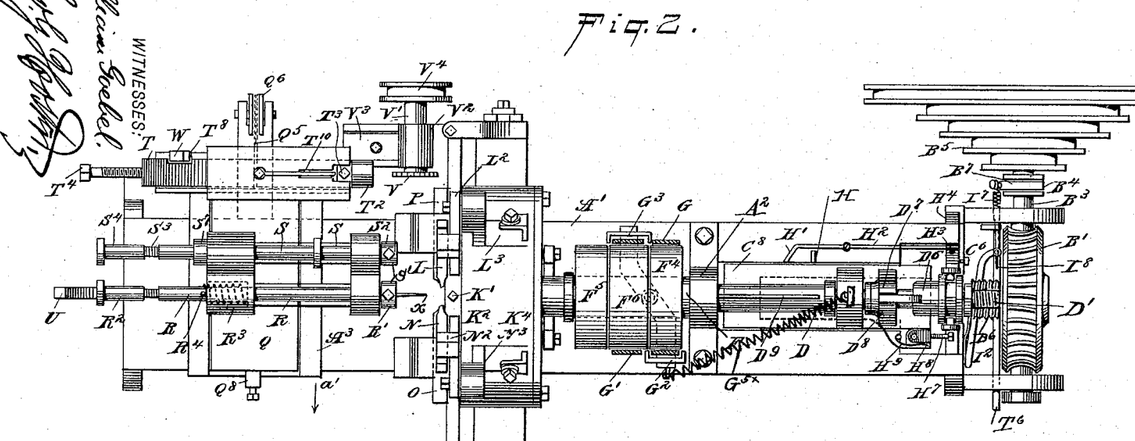
Fig. 2 is a plan view of the same.
Figure 3:
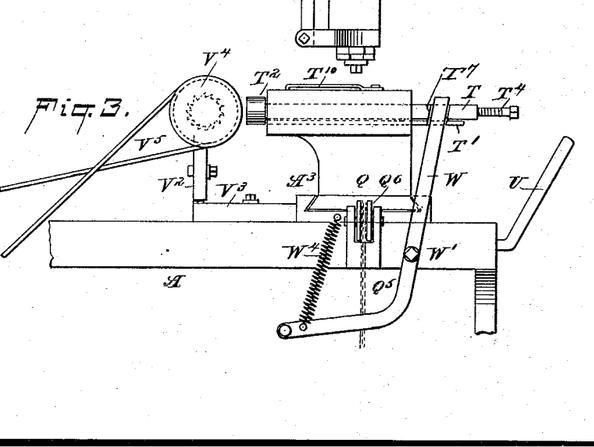
Fig. 3 is a rear elevation of the head-slotting device.
Figure 4:
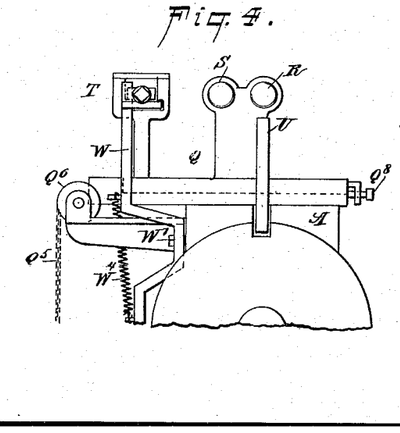
Fig. 4 is a lower end view of part of the improvement.

The rear end of the shaft R is reduced and threaded to engage a nut $R^2$, adapted to be acted on by the upper end of the lever U, to impart a forward sliding motion to the said shaft R, to move the drill in contact with the screw-blank, so that the rotation of the latter causes a boring of a hole in the blank on the forward feeding of the said shaft R. The return movement of the shaft R is caused by a spring $R^3$ coiled on the shaft and held in one of the bearings for the shaft, as indicated in Fig. 2. The inner end of the spring $R^3$ abuts against the bearing, and its outer end against a pin $R^4$, held in the shaft R.

Figure 15:
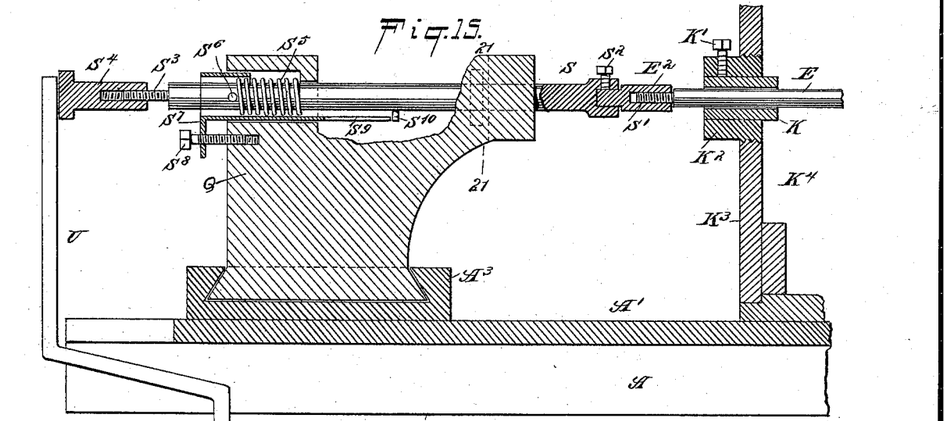
Fig. 15 is an enlarged sectional side elevation of the screw tapping device.

The die shaft S (see Figs. 15, 16 and 17) is provided with a socket adapted to carry the die S', for cutting the thread on the reduced end of the stock E. This die S' is held in place in the socket by a set screw $S^2$, and can be readily changed according to the size of the screw to be made. The rear end of the shaft S is provided with the reduced threaded portion $S^3$, on which screws a nut $S^4$ adapted to be engaged by the lever U, so as to move the shaft S longitudinally, to bring the die S' onto the reduced end to cut the threads thereon, it being understood that during this operation the stock E is clamped in the sleeve D', and rotated by the spindle F as previously described. The return movement of the shaft S is accomplished during the time the stock E is rotated in an opposite direction at the time the belts G and G' are shifted as previously described, and this return movement of the shaft S is accomplished by a spring $S^5$ acting on the shaft in one of its bearings, as shown in Figs. 15 and 16. One end of the spring $S^5$ rests on the said bearing, and its outer end on a pin $S^6$ held on the said shaft S.

Figure 18:
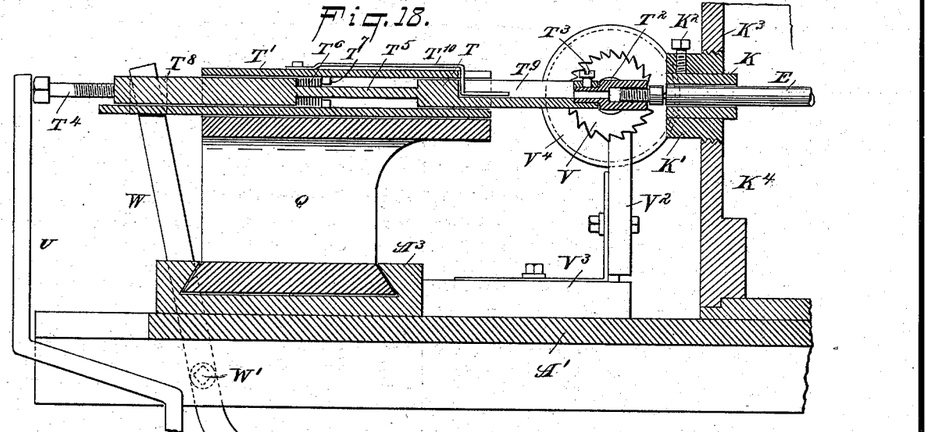
Fig. 18 is an enlarged sectional side elevation of the device for removing the tapped screw from the stock and holding it for slotting.
Figure 19:
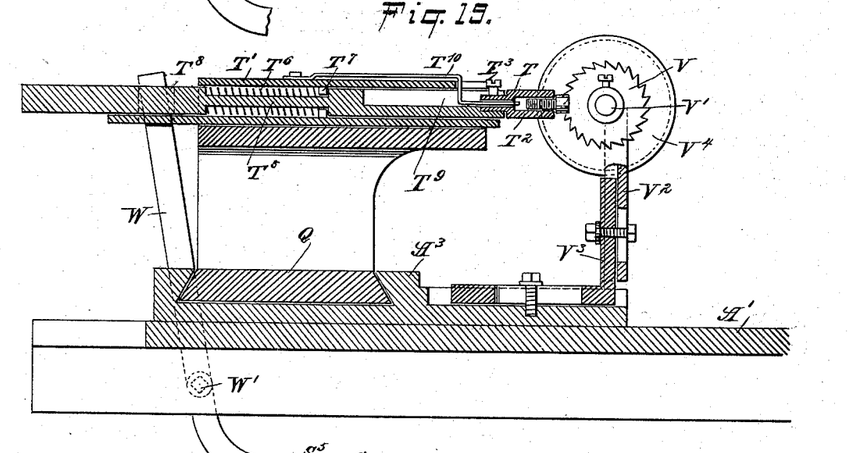
Fig. 19 is a like view of the same in position for slotting the head of the screw.
Figures 20, 21:
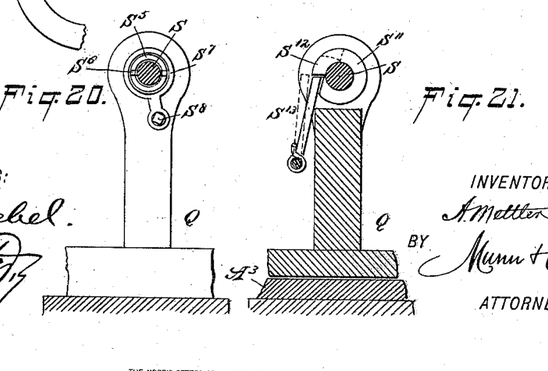
Fig. 20 is a transverse section of part of the tapping device, on the line 20—20 of Fig. 16.
Fig. 21 is a like view of part of the tapping device, on the line 21—21 of Fig. 15.

While feeding the shaft S inward to tap the screw shank, the said shaft S is prevented from turning, and for this purpose I provide a sleeve $S^7$, held in place on the carriage Q by a set screw $S^8$. This sleeve is concentric to the shaft, and is provided with a forwardly-projecting slotted tongue $S^9$, engaging a pin $S^{10}$ secured on the shaft S. Now as long as the pin $S^{10}$ is in engagement with the said slotted tongue, the shaft cannot revolve, but as soon as the lever U has moved the shaft S forward to finish threading the shank, then the pin $S^{10}$ leaves the slotted tongue $S^9$, as indicated in Fig. 15. The shaft S can now revolve with the stock E during the time the shifting of the belts G' and G takes place, and when this has been accomplished, the shaft is again locked in place by a collar $S^{11}$ secured on the shaft, and formed with a shoulder $S^{12}$ adapted to be engaged by a spring-pressed arm $S^{13}$ held on the carriage Q. See Fig. 21. Thus when a turn has been made by the shaft S, the said spring-pressed arm $S^{13}$ engages the shoulder $S^{12}$, and consequently prevents further rotation of the shaft S, the latter then standing with its pin $S^{10}$ in alignment with the slot in the tongue $S^9$. The spring $S^5$ compressed on the inward movement of the shaft S, now causes a return movement of the shaft, and a consequent unscrewing of the threaded shank $E^2$ from the die S' on the revolving of the stock E in the inverse direction. After the die S' leaves the threaded shank the carriage Q is again shifted in the direction of the arrow $a'$, so as to bring the holder T in alignment with the screw. During the shifting of the carriage in the direction indicated, the cutters N and P cut the stock E to form the head of the screw, a small portion being left standing to connect the screw with the stock, as shown in Fig. 18. When this has been done, the cutters recede, and the holder T is now advanced to engage the shank of the screw, to break the latter off from the stock and to carry it transversely in the inverse direction of the arrow $a'$, to slot the head of the screw. This holder T and the mechanism for operating the same is shown in detail in Figs. 18 and 19, and is preferably made square in cross section and fitted to slide longitudinally in the slide T', having a longitudinal movement in the carriage Q, this double movement being necessary to first engage the holder with the screw, and then to feed the screw to the slotter, as hereinafter more fully described. In the front end of the holder T is secured a head $T^2$, by means of a set screw $T^3$, and this head is formed with an aperture of the size of the threaded shank of the screw to engage the latter. The head $T^2$ is changed according to the size of the screw to be finished.

In the rear end of the holder T screws a screw $T^4$, adapted to be engaged by the lever U previously mentioned, so as to impart a sliding motion to the said holder, to move the head $T^2$ in engagement with the threaded shank of the screw at the time the said holder is in alignment with the stock, as previously described. See Fig. 18. The holder T is provided within the slide T' with the reduced portion $T^5$, on which is coiled a spring $T^6$, resting with one end against a shoulder on the holder T and at its other end on lugs $T^7$, forming part of the slide T'. Thus after the holder T has been moved in engagement with the threaded screw, and the carriage Q has been moved sidewise, to cause a breaking off of the screw on the stock E, then at the same time the screw $T^4$ moves off the lever U, and the previously compressed spring $T^6$ moves the holder T outward into its original position, the outward movement being limited by the lugs $T^7$. (See Fig. 19.) The carriage Q now continues its lateral movement in the inverse direction of the arrow $a'$, and until the stop $Q^8$ rests against the guideway $A^3$, as previously described.

In the rear side of the slide T' and the holder T, are formed registering slots $T^8$, adapted to be engaged by the upper end of a lever W, at the time the carriage Q moves in its outermost position. This lever W is fulcrumed at W' to the main frame A, and its lower end is adapted to be acted on by a cam $W^2$ secured on the cam shaft B, and having a single cam surface $W^3$. A spring $W^4$ held on the main frame A, connects with the lower end of the said lever W, to move the latter back into its normal position after the cam surface $W^3$ has passed the said lever. When the carriage Q stands in its rearmost position, then the center of the holder T is in alignment with a circular cutter V, so that when the holder is now moved forward by the action of the lever W on the slide T' and holder T, the head of the screw is moved in contact with the cutting edge of the cutter V, so that the head is slotted, it being understood that the depth of the slot is regulated by the cam surface $W^3$ acting on the lever W, for feeding the holder T forward. This cutter V is secured on a transversely-extending shaft V', mounted to turn in suitable bearings in a bracket $V^2$ held vertically adjustable in a bracket $V^3$ held longitudinally adjustable on the main frame A, as plainly shown in Fig. 19. On the rear end of the shaft V' is secured a pulley $V^4$, connected by a cross belt $V^5$ with a pulley $B^8$ forming part of the cone $B^5$. On the top of the bearing for the holder T, is secured a push rod $T^{10}$, extending into a recess $T^9$ formed in the top of the holder T, and engaging with its forward end a central aperture in the head $T^2$, so that when the slide T', with the holder T, recedes by the action of the spring $W^4$ on the lever W, then the said push-rod engages the slotted screw and pushes the latter out of the head $T^2$, whereby the screw is discharged to one side of the machine in a finished condition.

Figures 1, 22, 23:
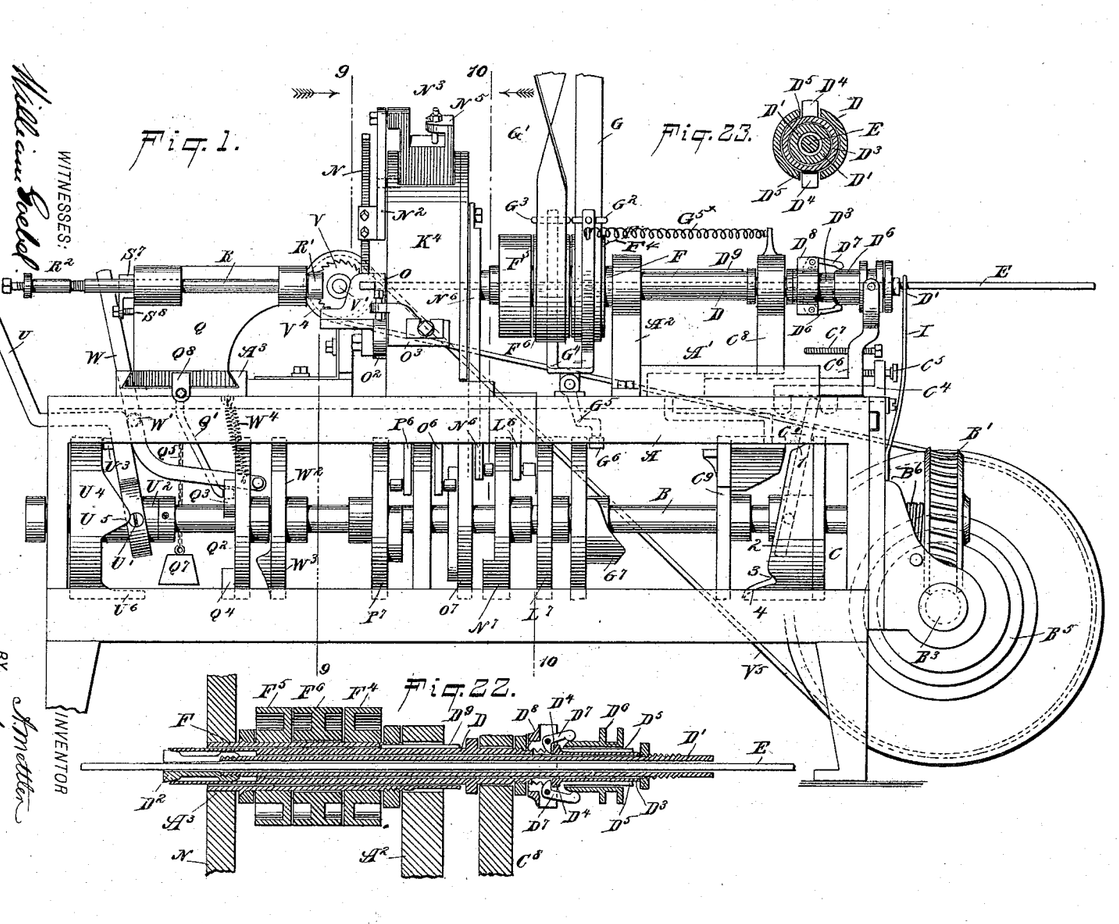
Figure 1 is a side elevation of the improvement.
Fig. 22 is an enlarged sectional side elevation of the spindle and adjacent parts.
Fig. 23 is a transverse section of the same.
Figure 5:
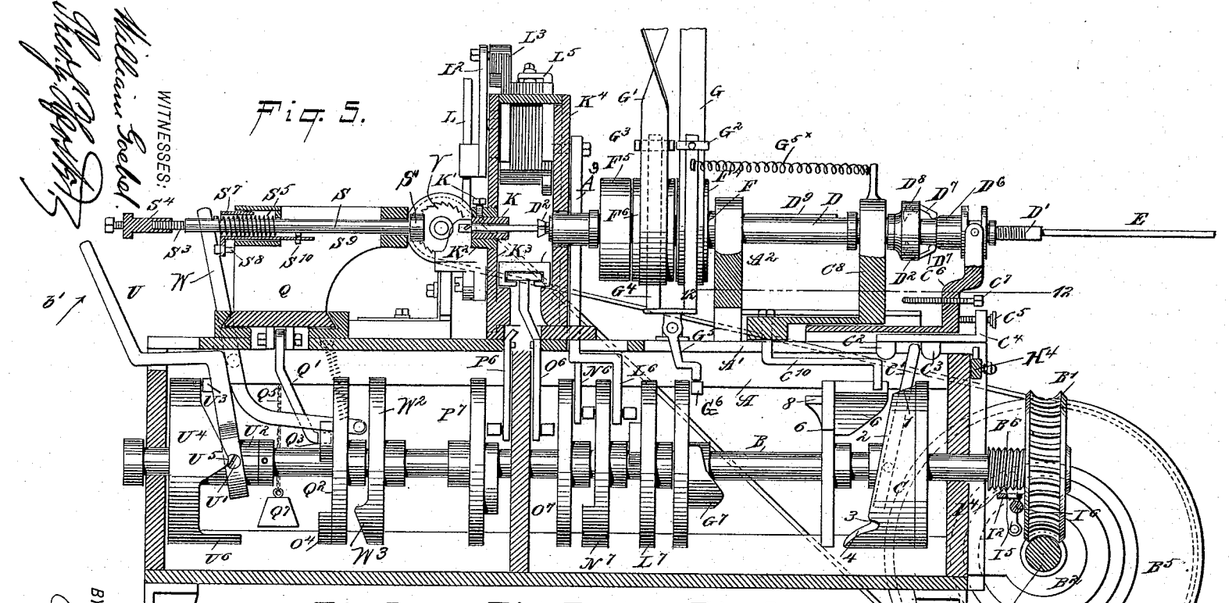
Fig. 5 is a sectional side elevation of the improvement.
Figure 6:
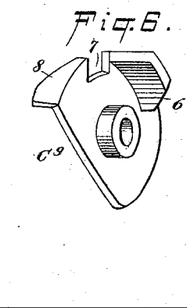
Fig. 6 is a perspective view of the cam for the return movement of the feed carriage.
Figures 7, 8:
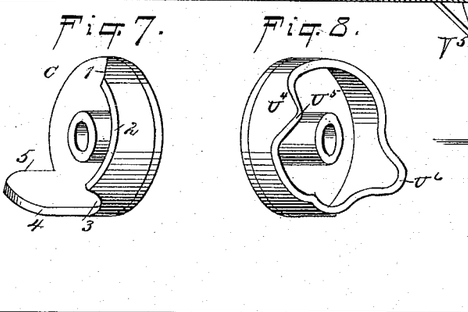
Fig. 7 is a like view of the cam for the forward movement of the feeding device.
Fig. 8 is a similar view of the cam for actuating the tapping mechanism.

When the several parts are in the position illustrated in Figs. 1, 2 and 5, then the belt G drives the spindle F in which is splined the sleeve D, carrying sleeve D', holding the stock E, and the said sleeve D is now fed forward by the action of the cam C on the lever C', as previously described, whereby the front end of the stock E is passed through the bushing K a distance corresponding to the length of the screw to be made, this distance being regulated by the screw $C^7$. During the forward movement of the stock the drill shaft R is advanced by the action of the lever U, so that in case a drill is carried by the said shaft an aperture is bored into the end of the stock projecting beyond the bushing K.

At the time the stock is fed forward and passes out of the bushing K, the cutters L and O are moved radially inward by the action of the cams $L^7$ and $O^7$, whereby the projecting end of the stock is reduced and the shank for the screw is formed. When this has been done, the lever Q' of the carriage Q is acted on by its cam Q², to shift the carriage forward to bring the die shaft S in alignment with the screw. Then the lever U, being acted on by the cam surface U⁶ of the cam U⁴, causes a sliding of the said die shaft S, to engage the die S' with the blank end E' of the stock E, to cut the thread thereon, as illustrated in Fig. 15. The shifting of the belts G, G', now takes place by the action of the cam G⁷ on the shifting lever G⁵ as previously described, so that a reverse movement is given to the stock E, to cause the threaded shank E² to unscrew from the die S', which with the die shaft S is held in a fixed position by the action of the spring-pressed arm S¹³ engaging the shoulder S¹² of the collar S¹¹. The spring S⁵ then causes a rearward sliding of the die shaft S, and at the same time an outward feeding of the stock E takes place by the action of the cam C on the lever C', whereby the stock is left projecting beyond the sleeve K, a distance to form the head E³. See Fig. 16. The other cutters N and P now advance by sliding radially inward to cut the slot E⁴ to form the head E³ as previously described, and when this has been done, the carriage Q again moves in the direction of the arrow a', to bring the holder T in alignment with the screw, to engage the same by the action of the lever U on the said holder, and then by a transverse movement of the carriage Q in the inverse direction of the arrow a', to break off the screw from the end of the stock E. The holder T is then returned to its normal position, and likewise the carriage Q, so that the lever W engages the holder and slide, to move both simultaneously forward, and the head of the screw in engagement with the cutter V. The latter now cuts or forms the slot in the head of the screw, after which the slide and holder move backward and the push rod T¹⁰ forces the finished screw out of the head T², and thus the finished screw is delivered to one side of the machine. The above described operation is then repeated, that is, the stock is again fed forward, the projecting end reduced, the thread is cut thereon and then the head is formed, after which the screw is broken off from the shank and moved to the cutter for forming a slot in it, and if desired, an aperture may be bored in the screw by inserting a suitable drill in the drill shaft R, as above described. After the entire wire or rod forming the stock has passed into the machine, then the lever I, drops off the stock as the latter passes into the sleeve D', whereby the spring lever I² is released and the thread B⁶ imparts a swinging motion to the said lever, to move the end I⁵ thereof out of engagement with the notch in the shifting bar I⁶, so that the spring I⁷ pulls on the clutch shifter B⁷ and moves the clutch B⁴ out of engagement with the cone pulley B⁵, whereby rotary motion of the main driving shaft B³ and the cam shaft B ceases. The machine is thus brought to a standstill, and remains so until new stock is put into the sleeve D', and the lever I moved back to its position against the stock, and the clutch B⁴ again connected with the cone B⁵.

Having thus described my invention, I claim as new and desire to secure by Letters Patent—

1. In a screw-cutting machine, the combination of a stock sleeve, a slide in which said sleeve is mounted to turn, a clutch and levers for imparting a sliding movement to said sleeve, a second slide slidingly mounted on the first named slide and adapted to actuate said clutch, a third slide slidingly mounted on the second slide, a lever fulcrumed on the frame and adapted to engage and operate the said third slide, an actuating cam for said lever, a second cam, and a rod connected to the first-named slide and adapted to be actuated by the second cam to move said slides in the direction opposite to that in which they are moved by the first cam, substantially as set forth.

2. In a screw-cutting machine, the combination, with a stock sleeve adapted to carry the stock, a slide in which the said sleeve is mounted to turn, a clutch and levers for imparting a sliding motion to the said sleeve, a second slide for controlling the said clutch and fitted to slide on the said first named slide, a screw carried by the said second slide and adapted to engage the first named slide, and a third slide fitted to slide on the second slide and carrying a screw adapted to engage the said second slide, substantially as shown and described.

3. In a screw-cutting machine, the combination, with a stock sleeve adapted to carry the stock, a slide in which the said sleeve is mounted to turn, a clutch and levers for imparting a sliding motion to the said sleeve, a second slide for controlling the said clutch and fitted to slide on the said first named slide, a screw carried by the said second slide and adapted to engage the first named slide, a third slide fitted to slide on the second slide and carrying a screw adapted to engage the said second slide, a lever for imparting motion to the said third slide, and a cam for actuating the said lever, substantially as shown and described.

4. In a screw-cutting machine, the combination, with a stock sleeve adapted to carry the stock, a slide in which the said sleeve is mounted to turn, a clutch and levers for imparting a sliding motion to the said sleeve, a second slide for controlling the said clutch and fitted to slide on the said first named slide, a screw carried by the said second slide and adapted to engage the first named slide, a third slide fitted to slide on the second slide and carrying a screw adapted to engage the said second slide, a lever for imparting motion to the said third slide, a cam for actuating the said lever, a second cam rotating in unison with the said first cam, and a rod connected with the said first slide and acted on by the said second cam, substantially as shown and described.

5. In a screw-cutting machine, the combination with a stock sleeve adapted to carry the stock, a slide in which the said sleeve is mounted to turn, a clutch and levers for imparting a sliding motion to the said sleeve, a second slide for controlling the said clutch and fitted to slide on the said first named slide, a screw carried by the said second slide and adapted to engage the first named slide, a third slide fitted to slide on the second slide and carrying a screw adapted to engage the said second slide, a rod or arm connected with the said first slide, and a revoluble cam for actuating the said rod or arm, to cause a return movement of the said slides, substantially as shown and described.

6. A screw-cutting machine, provided with a stopping mechanism comprising a lever adapted to rest on the stock from which the screws are cut, a second lever locked normally in place by the said first named lever, a lug on the said second lever, a shaft carrying threads adapted to be engaged by the said lug, and a catch adapted to be actuated from the said second lever, and adapted to unlock the spring-pressed clutch or shifting rod, substantially as shown and described.

7. In a screw-cutting machine, the combination of a frame and a feeding mechanism for the stock, a carriage located on the frame and adapted to be moved transversely of the plane of the feed, means for actuating said carriage to impart an intermittent reciprocatory movement to the same, a tapping mechanism borne on the carriage and adapted to form the thread of the screw, a slide having a lateral recess, said slide being mounted on the carriage and adapted for longitudinal movement in a direction parallel to the feed of the stock, a holder carried by said slide and adapted to receive the tapped screw, means for imparting a forward movement to the holder when the same is in position to receive the tapped screw, a rotating cutter mounted on the frame in front of the carriage, a lever fulcrumed on the frame and adapted to engage the lateral recess in the slide when the same is in position in front of the cutter, and means for actuating said lever, whereby said slide is moved endwise to form the slot in the screw-head, substantially as set forth.

8. A stopping mechanism for screw-cutting machines comprising a clutch, a notched rod connected to said clutch and adapted to actuate the same, a retracting spring, a worm on the machine shaft, a spring having one end in engagement with the notch of said rod and provided with a tooth adapted to engage the worm, and a rod pivoted on the frame, one end of the rod being adapted to rest on the spring and hold the tooth thereof away from the worm, the other end of said lever being weighted and adapted to be supported by the stock, substantially as set forth.

ADOLF METTLER.

Witnesses:
CHARLES ROSENTHAL,
F. W. BACKES.